US008561143B2

(12) United States Patent
Cope et al.

(10) Patent No.: US 8,561,143 B2
(45) Date of Patent: *Oct. 15, 2013

(54) PROXY REGISTRATION AND AUTHENTICATION FOR PERSONAL ELECTRONIC DEVICES

(71) Applicant: Sprint Communications Company L.P., Overland Park, KS (US)

(72) Inventors: Warren B. Cope, Olathe, KS (US); Shane R. Werner, Olathe, KS (US); Douglas Alan Olding, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/719,371

(22) Filed: Dec. 19, 2012

(65) Prior Publication Data

US 2013/0109355 A1    May 2, 2013

Related U.S. Application Data

(63) Continuation of application No. 11/668,655, filed on Jan. 30, 2007, now Pat. No. 8,365,249.

(51) Int. Cl.
    *G06F 7/04*    (2006.01)
(52) U.S. Cl.
    USPC ............... 726/3; 713/150; 455/411; 455/410
(58) Field of Classification Search
    USPC ................ 726/3; 713/150; 455/410, 411
    See application file for complete search history.

(56) References Cited

U.S. PATENT DOCUMENTS

| 6,839,731 | B2 | 1/2005 | Alexander et al. |
| 7,394,761 | B2 | 7/2008 | Foster et al. |
| 7,418,591 | B2 * | 8/2008 | Tachikawa .................... 713/155 |
| 7,512,081 | B2 | 3/2009 | Ayyagari et al. |
| 7,620,008 | B1 * | 11/2009 | Hayes et al. .................. 370/328 |
| 7,702,915 | B2 * | 4/2010 | McCann et al. .............. 713/184 |
| 7,797,537 | B2 | 9/2010 | Kurita et al. |
| 7,813,267 | B2 * | 10/2010 | Tsai et al. ..................... 370/218 |
| 7,840,206 | B2 * | 11/2010 | Kaechi .......................... 455/411 |
| 8,320,880 | B2 * | 11/2012 | Fok et al. ...................... 455/411 |
| 2006/0200670 | A1 | 9/2006 | Kuffel et al. |
| 2006/0282662 | A1 | 12/2006 | Whitcomb |
| 2007/0028104 | A1 | 2/2007 | Cohen et al. |
| 2007/0208953 | A1 * | 9/2007 | Durand et al. ................ 713/193 |

OTHER PUBLICATIONS

M.S. Bargh et al., "Fast Authentication Methods for Handovers Between IEEE 802.11 Wireless LANs," Proceedings of ACM (WMASH 2004), pp. 51-60, Oct. 2004.

(Continued)

*Primary Examiner* — Amare F Tabor

(57) ABSTRACT

Communication systems, media, and methods for authenticating and registering unauthenticated electronic devices are provided. The communication systems include authorized electronic devices that proxy authentication and registration for one or more unauthenticated electronic devices. The unauthenticated electronic devices connect to the authenticated electronic device over a personal area network and initiate a communication session—via the authenticated electronic devices—with an authentication server located on a secure broadband wireless network that connects the one or more authenticated electronic devices. When the authentication server authorizes the unauthenticated electronic devices to access the secure broadband wireless network, network configuration data is communicated to the unauthenticated electronic devices via the authenticated electronic devices.

20 Claims, 4 Drawing Sheets

(56) References Cited

OTHER PUBLICATIONS

Hillary Caituiro-Monge et al., "Friend Relay: A Resource Sharing Framework for Mobile Wireless Devices," 2 Proceedings of International Workshop of Wireless Mobile Applications and Services on WLAN Hotspots WMASH 2006, pp. 20-29, Sep. 29, 2006.

Rajiv Chakravorty et al., "MoB: A Mobile Bazaar for Wire-Area Wireless Services," Proceedings of ACM MobiCom, pp. 228-242, 2005.

Robert C. Chalmers et al., "Enabling Intelligent Handovers in Heterogeneous Wireless Networks," Mobile Networks and Applications, 11 (2): pp. 215-227, 2006.

Qing Li et al., "MIRES—An Information Exchange System for Mobile Phones," Proceedings of the 19th Annual ACM 5 Symposium on Applied Computing (SAC 2004), vol. 1, ACM Special Interest Group on Applied Computing, Nicosia, Cyprus, pp. 1196-1200, Mar. 14-17, 2004.

Hongwei Zhang et al., GS3: Scalable Self-configuration and Self-healing in Wireless Networks, PODC 2002, pp. 58-67, Jul. 21-24, 2002.

* cited by examiner

PROXY REGISTRATION AND AUTHENTICATION FOR PERSONAL ELECTRONIC DEVICES

RELATED CASES

This patent application is a continuation of U.S. patent application Ser. No. 11/668,655 that was filed on Jan. 30, 2007 and that is entitled "PROXY REGISTRATION AND AUTHENTICATION FOR PERSONAL ELECTRONIC DEVICES." U.S. patent application Ser. No. 11/668,655 is hereby incorporated by reference into this patent application.

INTRODUCTION

Conventionally, a mobile device is manually configured by a wireless subscriber or a technician to access wireless services on a cellular network. Prior to using the mobile device, the wireless subscriber or technician provisions the mobile device with cellular network access information and billing identifiers. The wireless subscriber or technician performs a manual configuration of the mobile device. Normally, the manual configuration includes: powering of and powering on the mobile device and entering various network codes and mobile device codes when the mobile device is in a setup mode. When the wireless subscriber receives a new mobile device or upgrades the mobile device, the manual configuration process is repeated.

Manual configuration of the mobile device is an error-prone procedure because manual configuration relies heavily on human intervention. Human intervention during the manual configuration process increases the probability that invalid network configuration or billing information is supplied to the mobile device. Also, manual configuration is wasteful where duplicate steps are taken when the wireless subscriber upgrades the mobile device or when a group of mobile devices belong to a single wireless subscriber is configured. Each mobile device in the group of mobile devices belonging to the single subscriber is individually and separately provisioned with the network configuration or billing information.

Thus, a need arises for a provisioning system that reduces human-intervention and duplicative configurations during device configurations and that solves other problems associated with manual configuration.

SUMMARY

The present invention is defined by the claims below. Embodiments of the present invention solve at least the above problems by providing communication systems, media, and methods for, among other things, automatically provisioning an electronic with network access and billing information. The present invention has several practical applications in the technical arts including registering unauthenticated electronic devices using authenticated electronic devices with prior network authorization, authenticating the unauthenticated electronic devices via the authenticated electronic devices, and adjusting account data to reflect services provided to unauthenticated electronic devices and authenticated electronic devices that are associated with a network subscriber.

In a first aspect, a set of computer-useable instructions provide a method of authenticating an unauthenticated electronic device via an authenticated electronic device. The unauthenticated electronic device polls for authenticated electronic device that are within a predefined distance of the unauthenticated electronic device. After the authenticated electronic device is located, network configuration requests are transmitted from the unauthenticated electronic device. When an authenticated electronic device that is within the predefined distance, is operating in a proxy mode, identifiers corresponding to the unauthenticated electronic device are transmitted to the authenticated electronic. However, when the authenticated electronic device is not operating in the proxy mode, a request to switch the authenticated electronic device to proxy mode is generated by the unauthenticated device. Once the identifiers are received by the authenticated device, the unauthenticated device may be authenticated to access a wireless network based on the identifiers.

In a second aspect, one or more tangible computer-readable media having computer-useable instructions embodied thereon for performing a method of registering an unauthenticated electronic device via an authenticated electronic device is provided. Identifiers corresponding to an unauthenticated electronic device are transmitted from an authenticated electronic device to an authentication sever. In turn, the authentication server checks a device database to locate an entry for the identifiers associated with unauthorized electronic device. When the identifiers are not in the device database, the authentication server generates an indication to deny access to the unauthorized electronic device. Otherwise, when the identifiers are in the device database, the unauthenticated electronic device is authenticated and registered with a network access account corresponding to the authenticated electronic device.

In a third aspect, a communication system to connect an unauthenticated electronic device to a wireless network is provided. The communication system includes authenticated and unauthenticated electronic devices. The authenticated electronic devices proxy network access requests for unauthenticated electronic devices over a personal area network that connects the unauthenticated electronic device to the authenticated electronic devices. The unauthenticated electronic devices are authenticated by an authentication server based on identifiers associated with the unauthenticated electronic devices.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
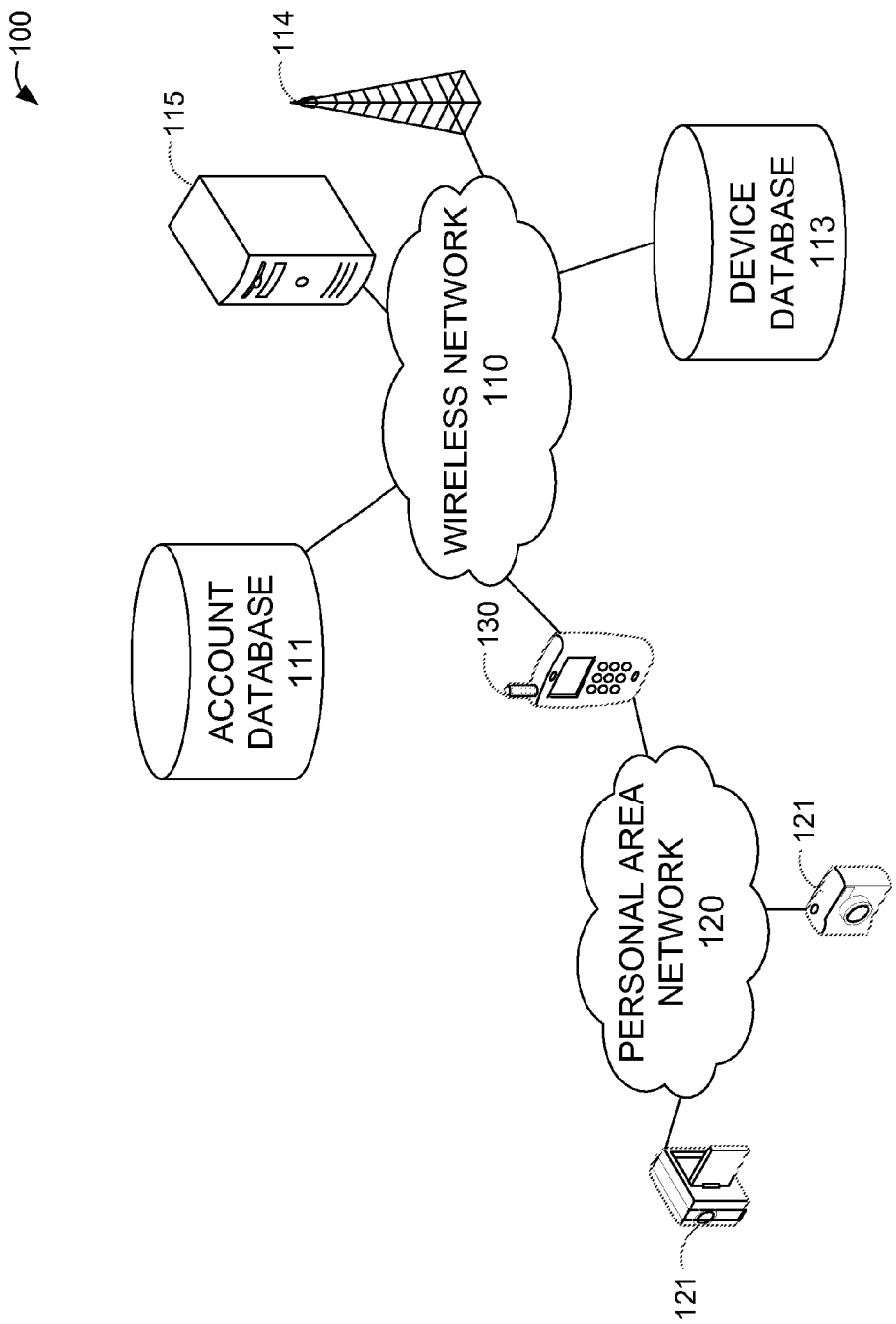
FIG. 1 is a network diagram that illustrates an exemplary operating environment, according to an embodiment of the present invention.

Embodiments of the present invention provide communication systems, media and methods for reducing human intervention when configuring an electronic device to access a communication network. A subscriber to a communication network may authenticate, register, and configure a second electronic device using a first electronic device that is authorized to access the communication network. Because the first electronic device is already authenticated, registered and configured to access the communication network, the first electronic device may authenticate the second electronic device by proxy. Accordingly, the second electronic device may be granted access to the communication network without having to contact a technician, who performs complicated programming on the second electronic device to configure the second electronic device to access the communication network.

In certain embodiments, utilizing the first electronic device to authenticate, register, and configure the first device by proxy may reduce server complexity, increase security in the communication network, and increase subscriber satisfaction. The complexity of the authentication server may be reduced, in a communication system where the first electronic device proxies authentication requests of subsequent electronic devices, and the authentication server focuses on authenticating the first electronic device and ensuring the integrity of the first electronic device. Once the first electronic device is authorized, workload for the authentication server may be reduced by chaining subsequent devices to the authorized first electronic device. Security in the communication network may increase because sensitive key identifiers may no longer be disclosed to the subscriber. Subscribers that attempt to configure subsequent electronic devices to access the communication network may experience savings in the time needed to configure subsequent electronic devices because authentication, registration and configuration are performed through the first authorized electronic device corresponding to the subscriber. The number or human errors introduced during, authentication, registrations, or configuration may be reduced because the first electronic device performs these function by proxy. Thus, embodiments of the present invention may provide a reduction in cost and errors associated with electronic device setup.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

In certain embodiments, a communication system enables an unauthenticated electronic device to proxy registration, authentication, and configuration via an authenticated electronic device to gain access to a communication network. The communication system may manage an account associated with a subscriber that operates the authenticated and unauthenticated electronic devices. When the unauthenticated electronic device is successfully authorized to access the communication network, the communication system automatically updates the account to reflect network usage associated with the unauthenticated electronic device and authenticated electronic device associated with the subscriber.

FIG. 1 is a network diagram that illustrates an exemplary operating environment 100, according to an embodiment of the present invention. The operating environment 100 includes, but is not limited to, databases 111 and 113, a collection of networks 110 and 120, devices 114, 115, 121, and 130 connected with at least one network in the collection of networks 110 and 120. The collection of networks includes, a wireless network 110 and a personal area network 120. The devices include an antennae 114, an authentication server 115, image-capture devices 121, and a wireless electronic device 130.

The wireless network 110 connects authenticated electronic devices 121 or 130 to servers 115 and other electronic devices 121 or 130 that are configured to connect to the wireless network 110. In an embodiment of the present invention, a subscriber to wireless network 110 tenders a monthly fee to receive data communication service or voice communication services over the wireless network 110. The wireless network 110 connects the antennae 114, the wireless devices 130, and the authentication server 115. The wireless network 110 also connects the device database 111 and account database 113 to the authentication server 115. In certain embodiments, the wireless network 110 is one of a cellular network, a radio frequency network, a Code Division Multiple Access (CDMA) network, or any other type of wireless communication network. In some embodiments, the wireless network 110 may facilitate the transfer of authentication identifiers and network access keys during registration or configuration of an electronic device 121 or 130. An electronic device 121 or 130 that is authorized to access the network 110 may authenticate, register and configure an unauthorized electronic device 121 or 130 via proxy.

The authentication server 115 access the account database 111 to ensure that a subscriber associated with an authenticate device is in good standing, i.e., no outstanding payments. The account database 111 stores billing data for each subscriber of the wireless network 110. The billing data includes, the number of authenticated electronic devices associated with each subscriber, electronic device identifiers, and services—voice, data, and video—associated with each authenticated electronic device. When subsequent electronic devices 121 or 130 are registered via an authenticated electronic device 130, the account database updates billing data associated with the authenticated electronic device 130. In some embodiments, an electronic serial number or media access control identifier of the unauthenticated electronic device 121 or 130 is stored and associated with the subscriber of the authenticated device 130. Additionally, the billing data may be updated to include service costs that define the services associated with the unauthenticated electronic device 121 or 130 and the price for each service. For instance, if the unauthenticated electronic device 121 or 130 requests content services, the cost for the content services is stored in the account database 111 and associated with the subscriber of the authenticated electronic device 130. In some embodiments, when the billing data associated with the subscriber is updated, a message is sent to the subscriber via the authenticated electronic device 130. The message may inform the subscriber that a subsequent electronic device 121 or 130 is linked to the subscriber's account.

In some embodiments, the authentication server 115 may utilize the device database 113 to deny access to electronic devices 121 or 130 that are not included in the device database 113. The device database 113 contains identifiers for a collection of devices that are able to connect to the wireless network 110. When the authentication server 115 receives a request to authenticate an unauthenticated electronic device 121 or 130, identifiers associated with the unauthenticated electronic device are utilized to traverse the device database to determine if matching identifiers are stored in the database. When no matching identifiers are found in the device database 113, the authentication server 115 denies access to the unauthenticated electronic device 121 or 130. Otherwise, the authentication server 115 may authorize access to the wireless network 110.

In certain embodiments, The antennae 114 enables an authenticated electronic device 130 to communicate with other authenticated electronic device 130 over the wireless network 110. The antennae receives the communication messages and routes the communication messages to the authenticated electronic device 130 on the wireless network 110.

The authentication server 115 may authenticate, register, and configure the electronic devices 121 and 130 to allow the electronic devices 121 and 130 to access the wireless network 110. The authentication server 115 may receive identifiers for an unauthenticated electronic device 121 or 130 from an authenticated electronic device 121 and 130. The authentication server 115 may then update the account database 111 to link the unauthenticated electronic device 121 or 130 to the account of the subscriber after the identifiers for the unauthenticated electronic device 121 or 130 are located in the device database 113. A subscriber that has an authenticated electronic device 121 or 130 on the wireless network 110 may leverage the authenticated electronic device 120 or 131 to authenticate other electronic device 121 and 130. For instance, a subscriber with an authenticated cell phone may utilize the cell phone to authenticate personal video players, digital cameras, or handheld gaming systems owned by the subscriber. In some embodiments, the authentication server 115 may require that subsequent electronic devices 121 or 130 to re-authenticate via the first authenticated electronic device periodically, i.e., weekly or monthly. When the first authenticated electronic device 121 or 130 communicates with the authentication server 115, identifiers for the subsequent electronic devices 121 or 130 are utilized to authenticate and register the subsequent electronic devices 121 or 130. In an embodiment of the present invention, the authentication server may operate on an authenticated electronic device 130, i.e., cell phone.

The personal area network 120 may connect authenticated electronic devices 121 and 130 to unauthenticated electronic devices 121 and 130. The personal area network 120 is a short distance network that may allow an unauthenticated electronic devices 121, i.e., image capture devices and authenticated electronic devices 130, i.e., wireless devices to communicate and exchange identifiers associated with the unauthenticated electronic devices 121, i.e., image capture devices that are attempting to gain access to the wireless network 110. The personal area network 120 may be a Universal Serial Bus (USB), Bluetooth, or Zigbee network. In an embodiment of the present invention, communication between authenticated electronic devices 121 and 130 to unauthenticated electronic devices 121 and 130 occurs when the devices are within a predetermined distance of each other.

In an embodiment of the present invention, the unauthenticated or authenticated electronic devices include image capture devices 121 and wireless devices 130. The image-capture devices 121 may include digital cameras and video cameras that capture events to create digital images and videos. The image-capture devices 121 may include a personal area network interface that connects the image-capture devices 121 to the personal area network 120 and a wireless device 130. In some embodiments, that image capture devices 121 may communicate with the wireless devices 131 to receive identifier information that is utilized for authentication and registration.

In some embodiments, the wireless device 130 may include cell phones, personal digital assistants, and smartphones that provide mobile voice capabilities to a subscriber. The wireless device 130 may include a personal area network interface that connects to the personal area network 120 and a wireless network interface that connects to the wireless network 110. The wireless devices 130 periodically receives authentication requests from unauthenticated electronic devices 121 or 130 over the personal area network. In turn, the wireless device 130 may proxy the authentication request to the authentication server 115. The wireless device 130 may receive configuration information from the authentication server 115 after the authentication request is successfully processed. The wireless device 130 may proxy the configuration information to the unauthenticated electronic device, which utilizes the configuration information to access the wireless network 110.

One of ordinary skill in the art appreciates and understands that the exemplary operating environment 100 has been simplified and that alternate arrangement fall within the scope and spirit of the above description.

In an embodiment of the present invention the authenticated electronic devices provide the unauthenticated electronic devices with configuration information that enables access to a wireless network. The configuration information is sent from the authentication server to the authenticated electronic device after the identifiers associated with the unauthenticated electronic device is located in a device database. The authenticated electronic devices transfer the configuration information over the personal area network to the unauthenticated device.

Figure 2:
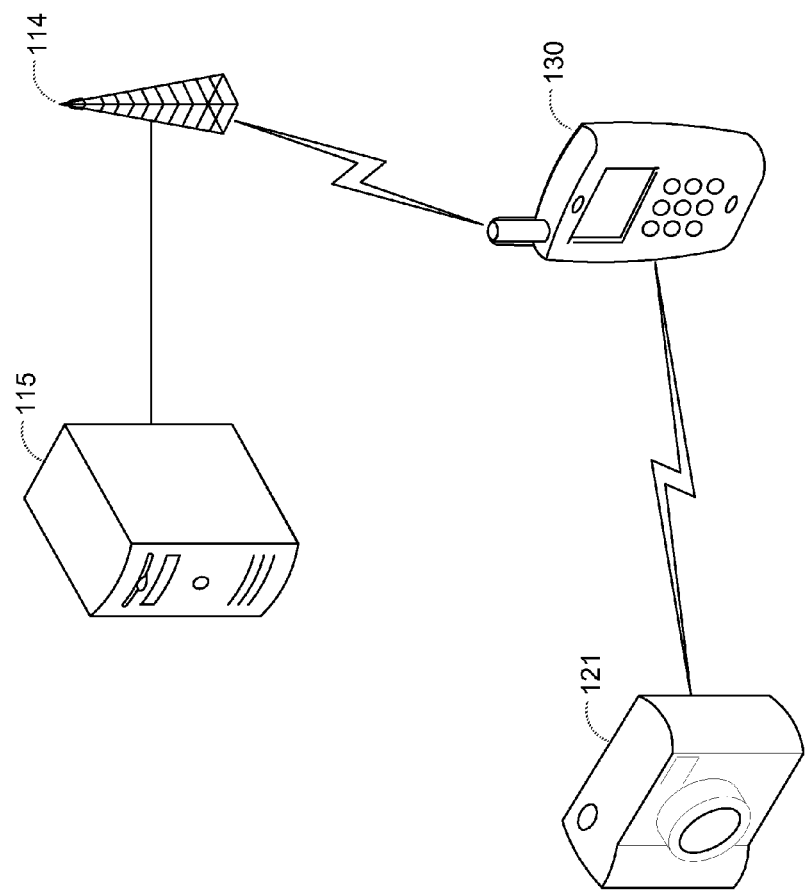
FIG. 2 is a network diagram that illustrates further details of a segment of the exemplary operating environment of FIG. 1, according to an embodiment of the present invention.

FIG. 2 is a network diagram that illustrates further details of a segment of the exemplary operating environment of FIG. 1, according to an embodiment of the present invention. The segment includes an antennae 114, an authentication server 115, an image capture device 121, and a wireless device 130.

The image capture device 121 and wireless device 130 both include personal area network interfaces that connect the image capture device 121 and wireless device 130 to the persona area network 120. The image capture device 121 and wireless device 130 exchange configuration and identifiers over the communication network. In some embodiments, the wireless device 130 is an authenticated electronic device that is associated with a subscriber and the image capture device 121 is an unauthenticated electronic device. The wireless device 130 may receive authentication requests that include identifiers associated with image capture device 121. The wireless device 130 may transmit the authentication requests received from the image capture device 121 over the antennae 114 to the authentication server 115.

The authentication server 115 receives the identifiers associated with the image capture device 121 and processes the identifiers to determine whether the image capture device should be granted access to the wireless network. In an embodiment, the identifier include media access control identifiers and electronic serial numbers. In some embodiments, the identifiers may be associated with watches, electronic ties, or any other unauthenticated electronic device configured with a personal area network interface that allows the unauthenticated electronic device to communicate with an authenticated electronic device over the personal area network.

The wireless device 130 is an electronic device that may operate in a proxy mode to authenticate the unauthenticated electronic devices, i.e., image capture devices 121. In proxy mode the wireless device 130 transfers the identifiers associated with the unauthenticated electronic devices to the authentication server 115. For instance, a subscriber with an authenticated electronic device may connect unauthenticated electronic devices to the authenticated electronic device for proxy authentication and registration. The authentication of unauthenticated electronic devices would occur by sharing electronic serial numbers or other unique identifiers over the personal area network to the authenticated electronic device, which would transmit the identifiers to the authentication server 112 for validation and registration. Once, the identifier are validated by a device database, the unauthenticated electronic devices are registered with a subscriber account associated with the authenticated electronic device. In turn, the authentication server 115 provides network access provisioning information that may enable the unauthenticated electronic devices to connect to the wireless network. The authenticated electronic device receives the network access provisioning information and transmits the network access provision information to the unauthenticated electronic devices. In some embodiment the network access provisioning information include preferred roaming lists that include alternate network frequencies, one-time shift keying logic which provides encrypted keys that are utilized to access the wireless network, and other provisioning information. Once the unauthenticated electronic device is configure with the network access provisioning information over the personal area network, the unauthenticated electronic devices resets and connects to the wireless network In certain embodiments, a subscriber may be prevented from authorizing to many devices, by limiting the number of unauthenticated electronic devices that can be associated with an account or by limiting a time period associated with the network access provisioning information of the unauthenticated electronic devices. A subscriber may be limited to granting wireless network access to a specified number of unauthenticated electronic devices. Once the threshold number of unauthenticated electronic devices is reached, the subscriber may be prohibited from granting access to other unauthenticated electronic devices. Additionally, the network access provisioning information sent to unauthenticated electronic devices may expire within a specified time period, i.e., 7 days. Thus a subscriber may have to re-authenticate a unauthenticated electronic devices after the specified time period expires. These limits are imposed on the system to prevent a subscriber from abusing the proxy authentication system. For instance, these security features may prevent a subscriber from granting wireless network access to a large community of users through a single subscriber account.

Embodiments of the present invention, provide computer-implemented methods for authenticating and registering unauthenticated electronic devices that have personal area network interfaces. The unauthenticated electronic devices are placed in an authentication mode that cause the unauthenticated electronic devices to poll for authenticated electronic devices that are within a predefine distance. Once the authenticated electronic devices are located, identifier information is transmitted to the authenticated electronic devices. In turn, the authenticated electronic devices authenticates, registers, and returns configuration information to the unauthenticated electronic devices that are validated by an authentication sever, and the validated unauthenticated electronic device is granted network access.

Figure 3:
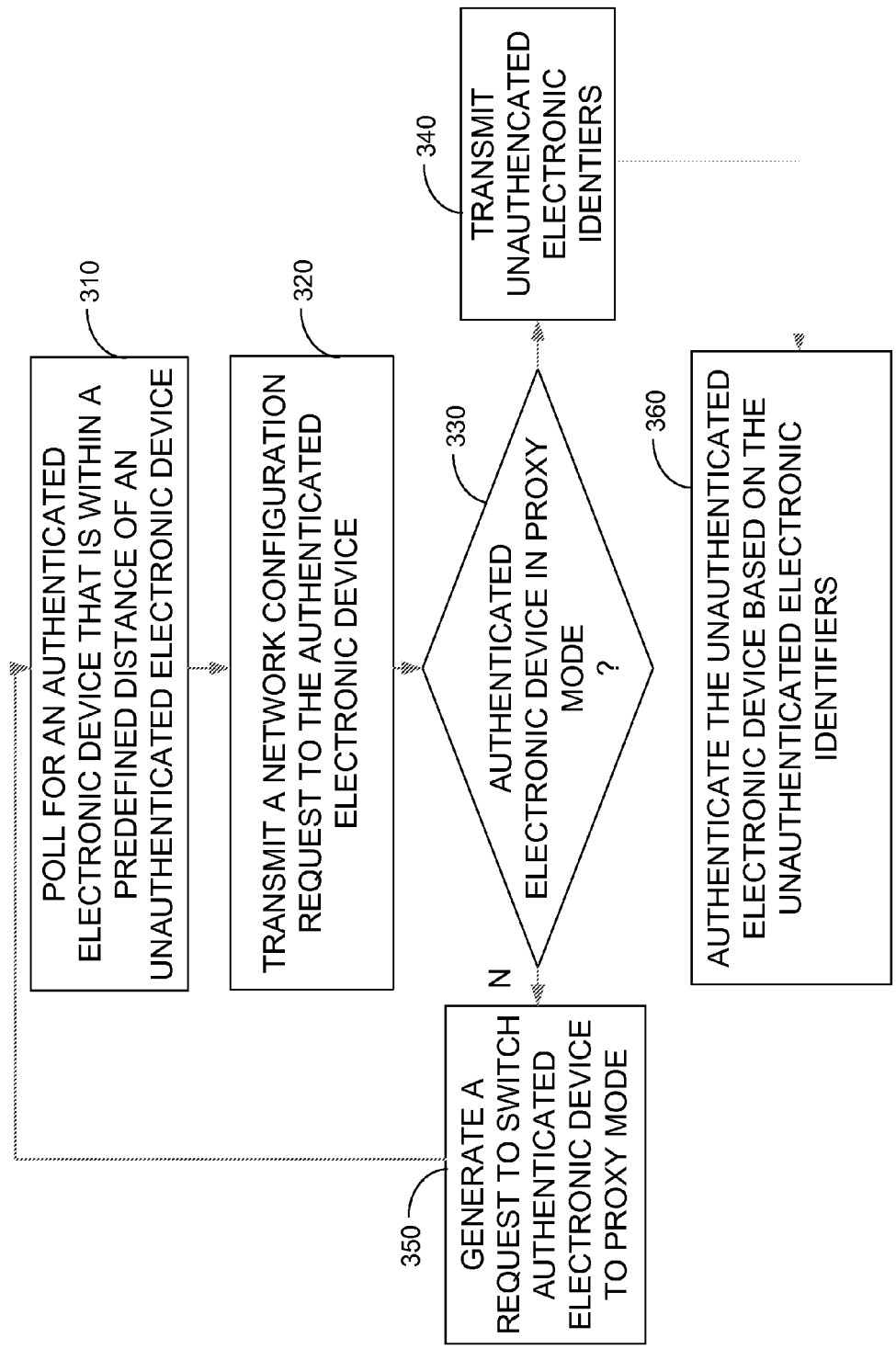
FIG. 3 is a logic diagram that illustrates a method to authenticate an unauthenticated electronic device via an authenticated electronic device, according to an embodiment of the present invention.

FIG. 3 is a logic diagram that illustrates a method to authenticate an unauthenticated electronic device via an authenticated electronic device, according to an embodiment of the present invention. In step 310, the unauthenticated electronic device polls for an authenticated electronic device that is within predetermined distance. In step 320, after locating the an authenticated electronic device, a network configuration request is transmitted to the authenticated electronic device. In step 330, a check is made to determine whether the authenticated electronic device is in proxy mode. If the authenticated electronic device is in proxy mode, identifiers for the unauthenticated electronic device are transmitted to the authenticated electronic device, in step 340. In turn, the unauthenticated electronic device is authenticated, by an authentication server, based on identifiers for the unauthenticated electronic device via the authenticated electronic device, in step 460. If the authenticated electronic device is not in proxy mode, a request is made to switch the device to proxy mode, in step 350 and control jumps to step 310 to locate an authenticated electronic device.

In some embodiments of the present invention, the authentication sever processes the identifiers and updates the account database when the identifiers are associated with a valid device electronic device. The account database is updated to include the services and identifiers of an unauthenticated electronic device. An entry associated with an authenticated electronic that provided the identifier information of the to the unauthenticated electronic device to the authentication server device is modified to monitor the network usage by the unauthenticated electronic device when the unauthenticated electronic device is configured with the network access provision information.

Figure 4:
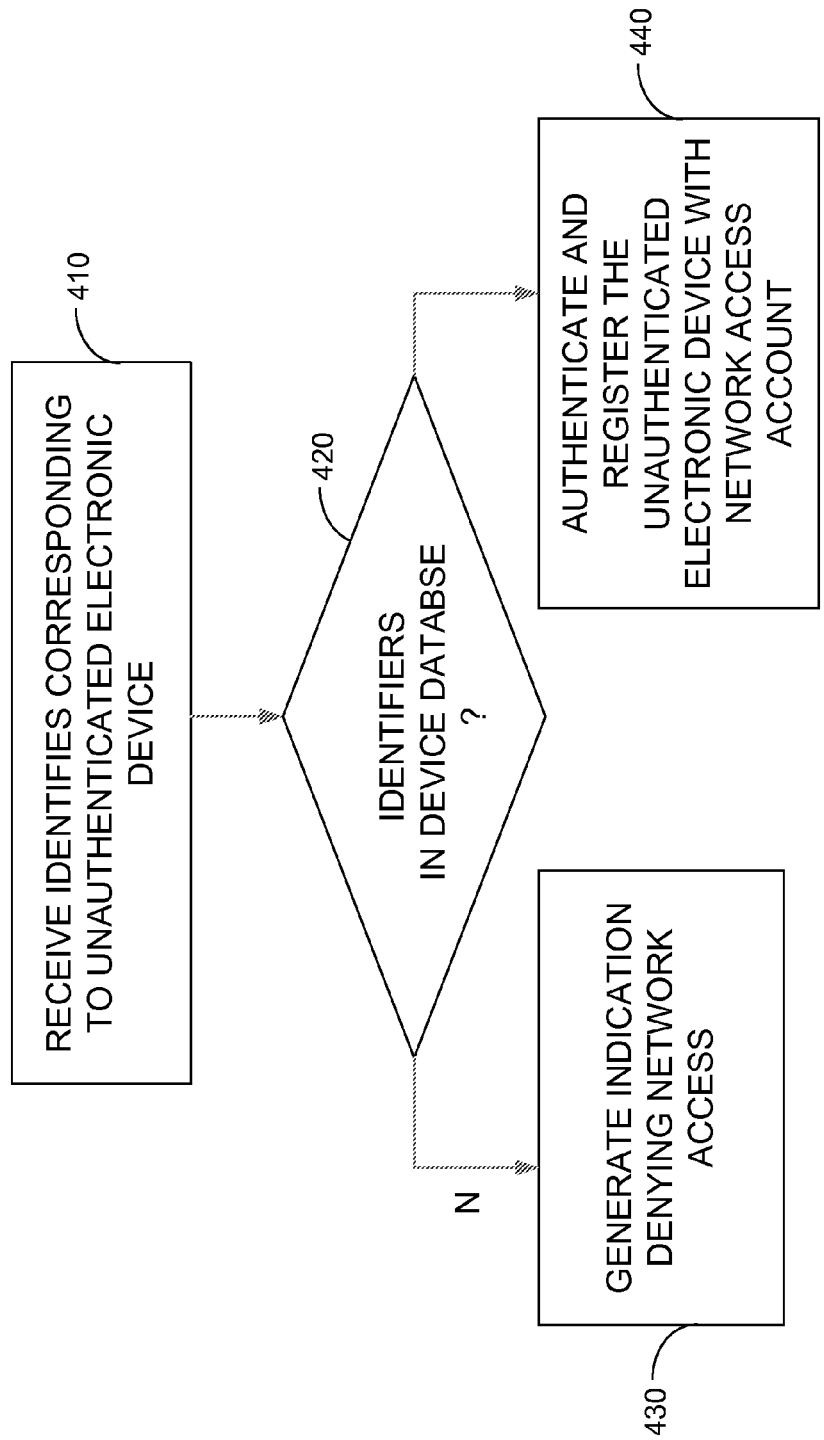
FIG. 4 is a logic diagram that illustrates a method to register an unauthenticated electronic device via an authenticated electronic device, according to an embodiment of the present invention.

FIG. 4 is a logic diagram that illustrates a method to register an unauthenticated electronic device via an authenticated electronic device, according to an embodiment of the present invention. In step 410, the authentication server receives identifiers corresponding to the unauthenticated electronic device. In step 420, the authentication server, checks a device database to locate an entry for the identifiers associated with unauthorized electronic device. When the identifiers are not in the device database, the authentication server generates an indication to deny access to the unauthorized electronic device, in step 430. When the identifiers are in the device database, the authentication server authenticates the unauthenticated electronic device and registers the unauthenticated electronic device with a network access account corresponding to the authenticated electronic device, in step 440.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of operating a communication system comprising:
 in a wireless cellular network, wirelessly exchanging voice and data with an authenticated wireless communication device;
 in the wireless cellular network, determining if the authenticated wireless communication device is operating in a proxy mode;
  when the authenticated wireless communication device is operating in the proxy mode, wirelessly receiving an access request from the authenticated wireless communication device that indicates an identity of an unauthenticated wireless communication device;
  when the authenticated wireless communication device is not operating in the proxy mode, wirelessly receiving a request to switch the authenticated wireless communication device to the proxy mode and wirelessly receiving an access request from the authenticated wireless communication device that indicates the identity of the unauthenticated wireless communication device;

in a server system, processing the access request to determine when a threshold number of allowable unauthenticated devices is reached for the authenticated wireless communication device, and when the threshold number is not reached, storing the identity of the unauthenticated wireless communication device for subsequent wireless cellular network access; and in the wireless cellular network, wirelessly exchanging data with the unauthenticated wireless communication device responsive to the stored identity of the unauthenticated wireless communication device.

2. The method of claim 1 further comprising, in the server system, automatically updating an account for the authenticated wireless communication device to reflect the wireless data exchange with the unauthenticated wireless communication device.

3. The method of claim 2 wherein automatically updating the account for the authenticated wireless communication device comprises defining the wireless data service provided to the unauthenticated wireless communication device.

4. The method of claim 3 wherein automatically updating the account for the authenticated wireless communication device comprises defining a cost of the wireless data service provided to the unauthenticated wireless communication device.

5. The method of claim 4 further comprising in the wireless cellular network, wirelessly transferring a message to the authenticated wireless communication device indicating the wireless data service provided to the unauthenticated wireless communication device.

6. The method of claim 1 wherein the authenticated wireless communication device comprises a smart-phone.

7. The method of claim 1 wherein the unauthenticated wireless communication device comprises a cell phone.

8. The method of claim 1 wherein the unauthenticated wireless communication device comprises a video player.

9. The method of claim 1 wherein the unauthenticated wireless communication device comprises a camera.

10. The method of claim 1 wherein the unauthenticated wireless communication device comprises a gaming system.

11. A communication system comprising:

a wireless cellular network configured to wirelessly exchange voice and data with an authenticated wireless communication device;

the wireless cellular network configured to wirelessly receive an access request from the authenticated wireless communication device that indicates an identity of an unauthenticated wireless communication device when the authenticated wireless communication device is operating in a proxy mode or to wirelessly receive a request to switch the authenticated wireless communication device to the proxy mode and wirelessly receive the access request from the authenticated wireless communication device that indicates the identity of the unauthenticated wireless communication device when the authenticated wireless communication device is not operating in the proxy mode;

a server system configured to process the access request to determine when a threshold number of allowable unauthenticated devices is reached for the authenticated wireless communication device, and when the threshold number is not reached, to store the identity of the unauthenticated wireless communication device for subsequent wireless cellular network access; and the wireless cellular network is configured to wirelessly exchange data with the unauthenticated wireless communication device responsive to the stored identity of the unauthenticated wireless communication device.

12. The communication system of claim 11 wherein the server system is further configured to automatically update an account for the authenticated wireless communication device to reflect the wireless data exchange with the unauthenticated wireless communication device.

13. The communication system of claim 12 wherein the server system is configured to define the wireless data service provided to the unauthenticated wireless communication device.

14. The communication system of claim 13 wherein the server system is configured to define a cost of the wireless data service provided to the unauthenticated wireless communication device.

15. The communication system of claim 14 wherein the wireless cellular network is configured to wirelessly transfer a message to the authenticated wireless communication device indicating the wireless data service provided to the unauthenticated wireless communication device.

16. The communication system of claim 11 wherein the authenticated wireless communication device comprises a smart-phone.

17. The communication system of claim 11 wherein the unauthenticated wireless communication device comprises a cell phone.

18. The communication system of claim 11 wherein the unauthenticated wireless communication device comprises a video player.

19. The communication system of claim 11 wherein the unauthenticated wireless communication device comprises a camera.

20. The communication system of claim 11 wherein the unauthenticated wireless communication device comprises a gaming system.

* * * * *